(12) United States Patent
Shimoda

(10) Patent No.: US 8,817,174 B2
(45) Date of Patent: Aug. 26, 2014

(54) INFORMATION RECORDING APPARATUS AND POWER-SAVING METHOD THEREFOR

(75) Inventor: Nozomu Shimoda, Ninomiya (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 551 days.

(21) Appl. No.: 12/763,857

(22) Filed: Apr. 20, 2010

(65) Prior Publication Data

US 2010/0295988 A1   Nov. 25, 2010

(30) Foreign Application Priority Data

May 20, 2009  (JP) .................................. 2009-121532

(51) Int. Cl.
| | |
|---|---|
| H04N 5/225 | (2006.01) |
| H04N 5/232 | (2006.01) |
| H04N 5/77 | (2006.01) |
| H04N 5/907 | (2006.01) |
| H04N 5/85 | (2006.01) |
| H04N 9/806 | (2006.01) |
| H04N 5/765 | (2006.01) |
| H04N 9/804 | (2006.01) |

(52) U.S. Cl.
CPC ................ *H04N 5/232* (2013.01); *H04N 5/907* (2013.01); *H04N 5/85* (2013.01); *H04N 9/8063* (2013.01); *H04N 5/765* (2013.01); *H04N 5/23219* (2013.01); *H04N 9/8042* (2013.01); *H04N 5/772* (2013.01); *H04N 5/23241* (2013.01)
USPC ...................................................... 348/372

(58) Field of Classification Search
None
See application file for complete search history.

(56) References Cited

U.S. PATENT DOCUMENTS

| | | | | |
|---|---|---|---|---|
| 7,152,172 | B2 * | 12/2006 | Tsirkel et al. | ................. 713/323 |
| 7,379,111 | B2 * | 5/2008 | Hoshi | ...................... 348/333.01 |
| 7,825,978 | B2 * | 11/2010 | Ito et al. | ................... 348/333.01 |

(Continued)

FOREIGN PATENT DOCUMENTS

| | | |
|---|---|---|
| JP | 11-242733 A | 9/1999 |
| JP | 2007-264049 A | 10/2007 |

(Continued)

*Primary Examiner* — Luong T Nguyen
(74) *Attorney, Agent, or Firm* — Kilpatrick Townsend & Stockton LLP

(57) ABSTRACT

An information recording apparatus for recording information obtained from a sensor, comprises: a face detecting unit for detecting a face of a person among the information obtained from the sensor; a face detection switching unit for switching a control of the face detecting unit between valid and invalid; a face detection setup information obtaining unit for obtaining information of whether face detection set up by the face detection switching unit is valid or invalid; a face detection observation unit for observing on whether detection is made on the face or not, when the face detection is valid; a power-saving controller unit for executing a power-saving control; a recording unit for record the information inputted from the sensor onto a recording medium; a recording observation unit for observing on whether recording of the information is conducted or not by the recording unit; a memory unit for memorizing information necessary for controlling the information recording apparatus; and a controller unit for controlling each constituent elements mentioned above, wherein the controller unit executes a control for reducing an electric power consumption of the information recording apparatus, by the power-saving controller unit, when determining that: the control of the face detection unit is valid from the face detection setup information obtaining unit; face detection is not made on the face of the person from the face detection observation unit; and recording of the information is not made from the recording observation unit.

12 Claims, 9 Drawing Sheets

(56) References Cited

U.S. PATENT DOCUMENTS

| | | | |
|---|---|---|---|
| 7,847,855 B2 * | 12/2010 | Funamoto | 348/349 |
| 7,885,511 B2 * | 2/2011 | Tsukui | 386/326 |
| 7,889,269 B2 * | 2/2011 | Okamoto | 348/345 |
| 8,073,319 B2 * | 12/2011 | Sugimoto | 396/123 |
| 8,116,536 B2 * | 2/2012 | Okada et al. | 382/118 |
| 8,218,080 B2 * | 7/2012 | Xu et al. | 348/552 |
| 2007/0165115 A1 * | 7/2007 | Sugimoto | 348/231.2 |
| 2007/0223912 A1 | 9/2007 | Sugimoto | |
| 2007/0237513 A1 | 10/2007 | Sugimoto et al. | |
| 2008/0180543 A1 | 7/2008 | Okamoto | |
| 2008/0309785 A1 * | 12/2008 | Sugimoto | 348/222.1 |

FOREIGN PATENT DOCUMENTS

| | | |
|---|---|---|
| JP | 2007-266692 A | 10/2007 |
| JP | 2007-324999 A | 12/2007 |
| JP | 2008-109485 A | 5/2008 |
| JP | 2008-187524 A | 8/2008 |
| JP | 2008-199443 A | 8/2008 |

* cited by examiner

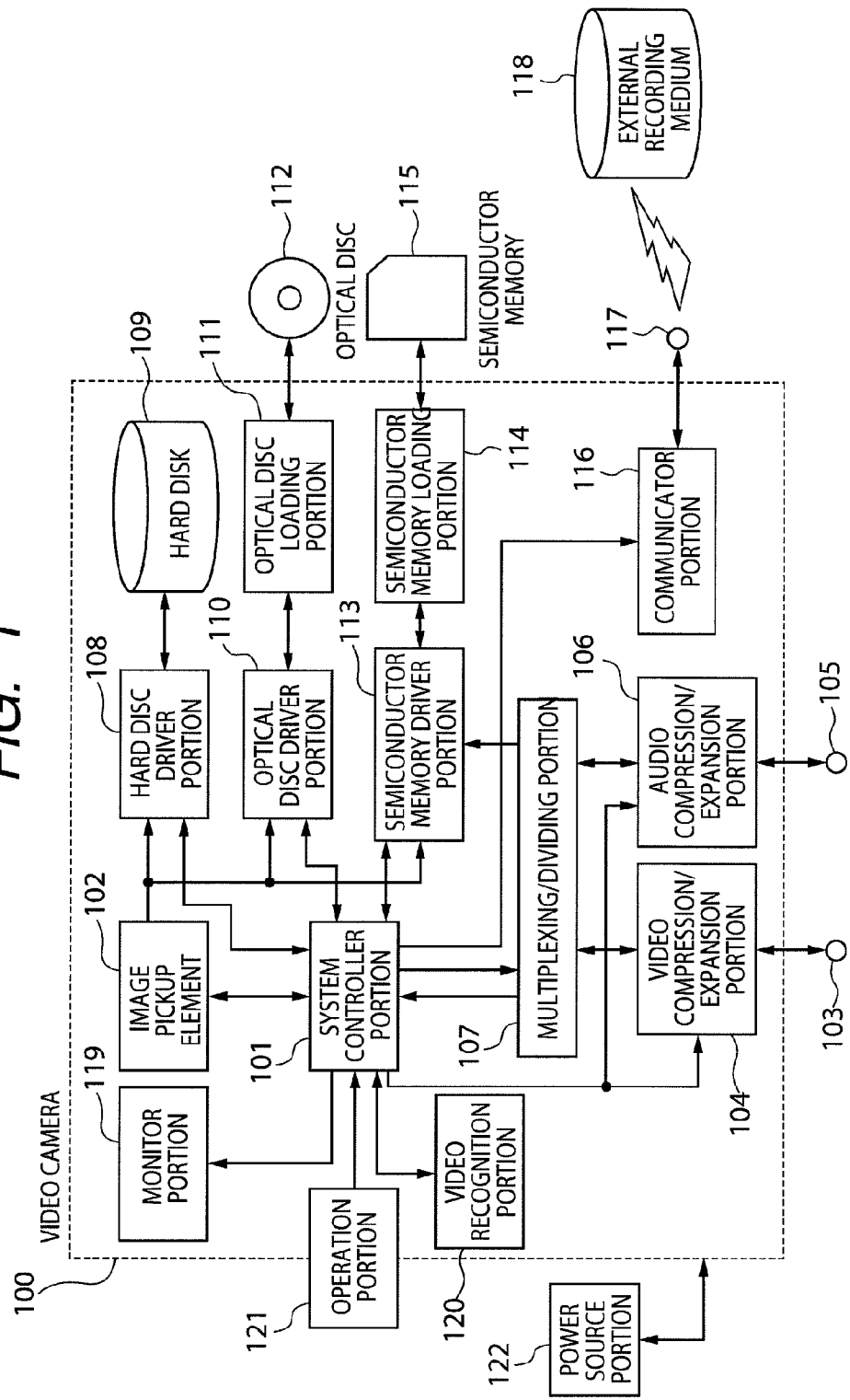

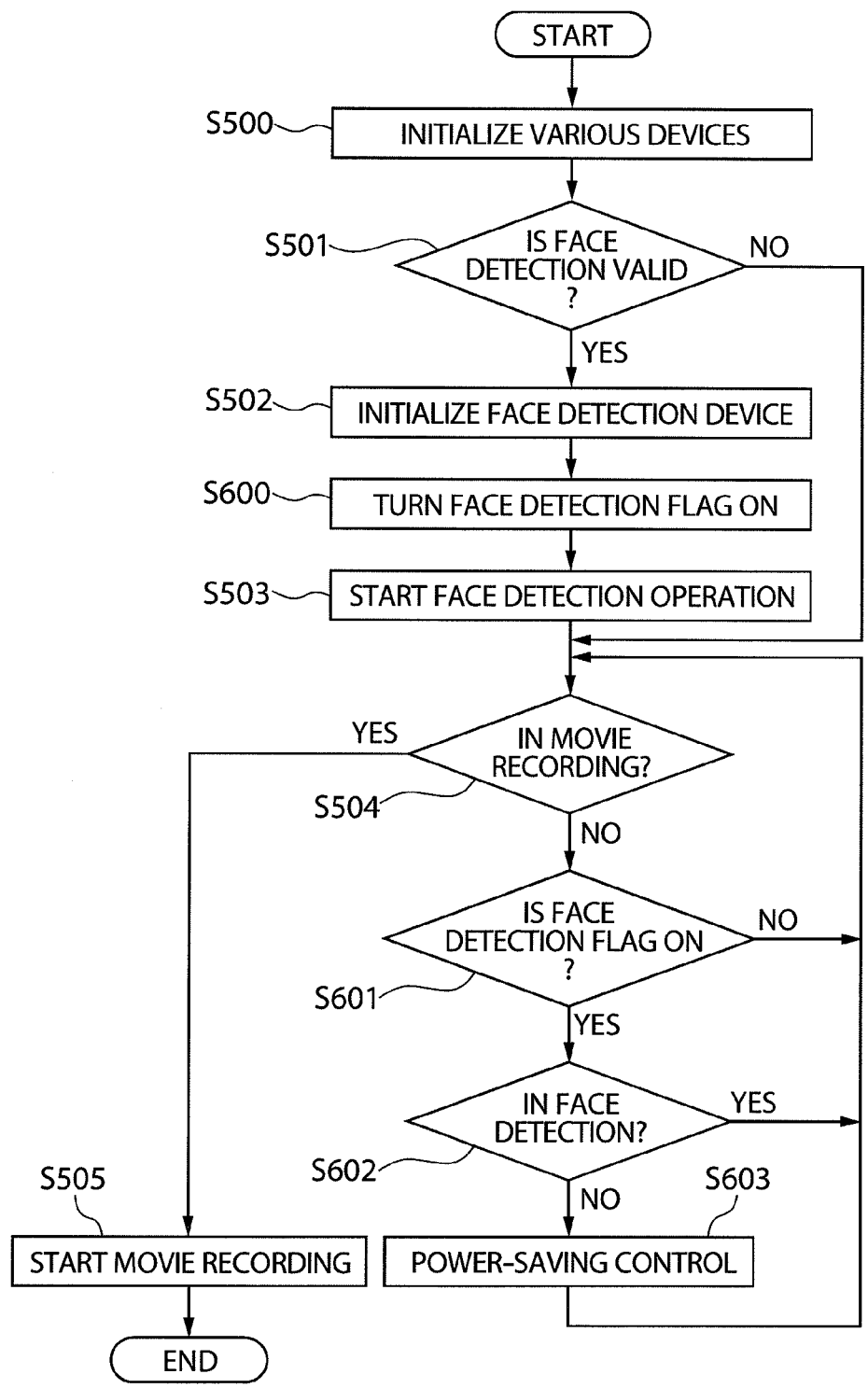

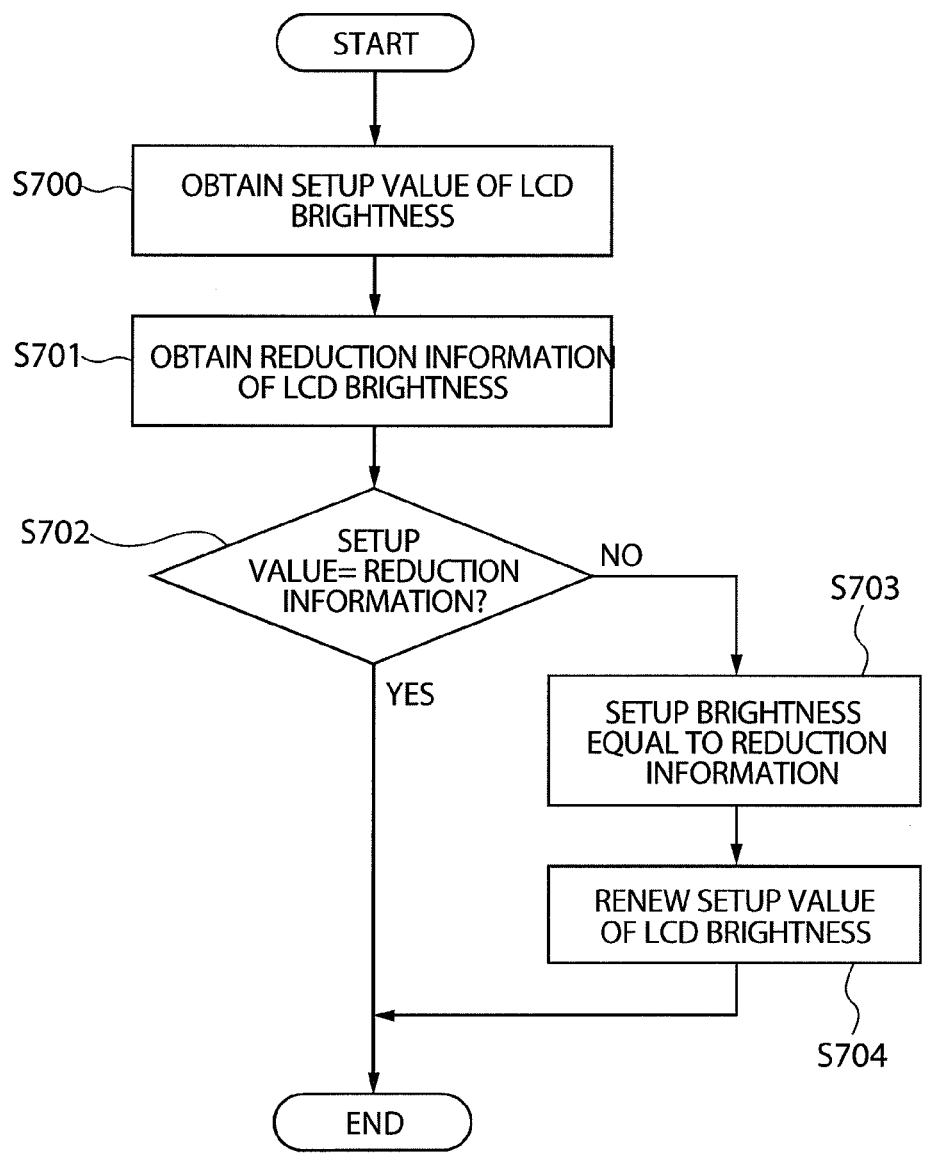

INFORMATION RECORDING APPARATUS AND POWER-SAVING METHOD THEREFOR

This application relates to and claims priority from Japanese Patent Application No. 2009-121532 filed on May 20, 2009, the entire disclosure of which is incorporated herein by reference.

BACKGROUND OF THE INVENTION

The present invention relates to an information recording apparatus and a power-saving method for the information recording apparatus.

In the following Patent Document 1 is mentioned, "there are provided a power-saving method and an apparatus thereof, for enabling detailed power-saving by conducting detailed power-saving controls upon basis of a face recognition", and there is disclosed an example, wherein decision is made on whether a man is in the front of a display for use of a computer or not, from the information of if a face can be detected from a video, which is picked up by a camera, and if no face can be detected for a predetermined time-period, a power source of the display is cut off, i.e., conducting the power-saving control.

PRIOR ART DOCUMENTS

Patent Documents

[Patent Document 1] Japanese Patent Laying-Open No. Hei 11-242733 (1999).

BRIEF SUMMARY OF THE INVENTION

In recent years, an application by face recognition is on a trend, in a market of digital cameras, especially. There are already known applications, for example, an application of detecting a position of the face, so as to conduct an exposure control and/or a focus control fitting to the face detected, and also an application of photographing a still picture when detecting a smiling face, by taking it as an opportunity, etc. Such trend of the face recognition applications, on the market of digital cameras, is also taken into a market of video cameras, and a face recognition technology, being developed for the purpose of recording a still picture within the digital camera, originally, is adapted/applied into the video cameras for recording moving pictures. As an example of applying the face recognition in the video camera, there can be listed up, not only the face detection exposure control and the focus control, but also an assist of photographing with a video recognition, such as, of the face, etc., for example, i.e., a video camera, installing such the application as mentioned above thereon, appears on the market. In this manner, it can be seen that the recognition technology comes to be trendy as a discriminating or distinctive technology, even in a world of the video cameras.

By the way, electric power consumption of the video camera becomes larger than that of the conventional one. As one of the reasons thereof can be listed a multifunction of the video camera.

For example, for achieving a function of the face recognition mentioned above, since there is necessity of driving a face recognition controller portion, comparing between the video camera installing the face recognition function therein and the video camera not installing the face recognition function therein, consumption of electric power comes to be large on the video camera installing the face recognition function therein. Further, accompanying with diversification of the recording media for the video cameras, various kinds of video cameras appear on the market, e.g., a video camera mounting an optical disc, such as, a DVD (Digital Versatile Disc) and/or a BD (Blu-ray Disc®), etc., a HDD (Hard Disc Drive), or a semiconductor memory thereon, and also a video camera of a hybrid type, mounting such recording media as mentioned above thereon in a plural number thereof in other words, the video camera mounts control devices much more than the conventional ones, as well as, becoming complex in the controls thereof, and spurs an increase of consumption of electric power thereof. It can be considered that such a trend continues in the further. Further, a power-saving controller unit executes a power-saving control upon the basis of the video information, which is set up by a power-saving level setup unit.

Since the video camera is presumed in the beginning that it is driven with a battery, then reduction is important, in particular, of consumption of the electric power therein, comparing to a recorder or a display, etc., to be used under the stationary condition. Also, for a user, a video camera, which can operate for a long time under a battery, is superior in the usability thereof.

As was explained in the above, an increase of electric power consumption accompanying with the multifunction of the video camera is a serious problem, which cannot be neglected, and it is a problem to be dissolved, how compatibility can be established between the multifunction and the power consumption thereof. For the user, the video camera is very attractive, which is multifunctional and is also less in the power consumption, i.e., being operable for a long time under the battery. However, with the conventional technology, it is impossible to dissolve this problem.

Then, according to the present invention, an object thereof is to provide a power-saving method with using the face detection function, installation of which is becoming common on the video camera.

For dissolving the object mentioned above, the information recording apparatus according to the present invention execute a control for suppressing the electric power consumption within a range of not causing a trouble in the usability for the user, when determining that the electric power consumption can be suppressed, judging from information of whether the camera is recording the moving picture or not, information of a face detection function is valid or invalid, and information of whether the camera is detecting a face or not.

According to the present invention, within the information recording apparatus mounting the face detection function, no useless electric power is consumed, but without losing the distinctive characteristics or features of the face detection function, and thereby providing the information recording apparatus, being superior in the usability and also the power-saving.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIG. 1 is a block diagram of a video camera, according to an embodiment of the present invention;

FIG. 6 is a view for showing an example of a processing flow, from the turning-on of the electric power to the beginning of recording a moving picture, within a video camera equipped with a power-saving control function;

FIG. 7 is a view for showing an example of the processing flow of the power-saving control, with changing luminance of LCD;

DETAILED DESCRIPTION OF THE PREFERRED EMBODIMENTS

Figure 3A:
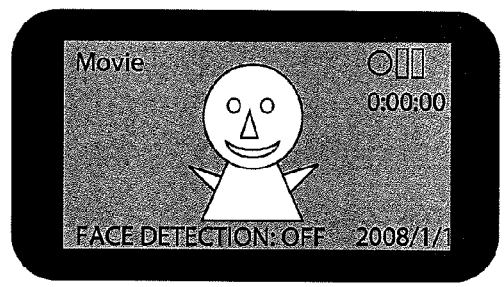
FIGS. 3A to 3D for showing an example of displays on a monitor portion of the video camera, in particular, when not recording a moving picture.

Hereinafter, preferred embodiments according to the present invention will be fully explained by referring to the attached drawings.

First of all, as an example of an information recording apparatus can be listed up the followings: an optical disc camera, a hard disc camera, a semiconductor memory camera, a network camera for recording data into an external storage on a network, and other than that, a camera apparatus for photographing a still picture or a moving picture. Or, there can be listed up an audio recording apparatus for recording voices.

In the present embodiment, explanation will be made with using a hybrid-type digital video camera (hereinafter, being called "video camera", simply), having a built-in hard disc, as an example of the information recording apparatus, an optical disc drive for enabling to read/write BD/DVD, a semiconductor memory slot for enabling to read/write the semiconductor memory, and a network connection portion for enabling to record data into an external storage on a network.

Further, the present video camera is effective in a general scene of using the video camera, school events for children, such as, an entrance ceremony or a graduation ceremony, a school sports meeting or a literary exhibition, etc., celebration events, a birthday party or a wedding ceremony, etc., a daily life within a home having small children, other than a travel to a pleasure resort. In particular, it is effective in the case where the video camera is used under the condition of keeping the battery for a long time while suppressing power consumption as small as possible, i.e., within a home, but the place where a person has gone.

However, the present invention should not be limited to this, but the same effect can be obtained, if using recording media other than the hard disc, the optical disc, the semiconductor memory and the external storage on the network, as the recording media being applicable in the information recording apparatus according to the present invention. Also, in case of the hybrid-type video camera, the effect would not be limited depending on a kind of the recording media to be combined with, and the same effect can be obtained with a (not hybrid-type) video camera, which can use only one recording medium.

In FIG. 1, a reference numeral 100 depicts a video camera. A reference numeral 101 is a system controller portion, having a CPU (Central Processing Unit) and a memory, and it control a system, as a whole. A reference numeral 102 depicts an image pickup element for picking up a picture of an object, to convert the picked-up information from an optical signal into an electric signal, and it also converts an analog electric signal into a digital signal. A reference numeral 103 depicts a video input/output terminal, and it conducts inputting/outputting of a digital video signal, which is compressed or expanded within a video compression/expansion portion 104. A reference numeral 105 depicts an audio input/output terminal, and it conducts inputting/outputting of a digital audio signal, which is compressed or expanded within an audio compression/expansion portion 106. A reference numeral 107 depicts a multiplexing/dividing portion, and it multiplexes video compression data and audio compression data, which are outputted from the video compression/expansion portion 104 and the audio compression/expansion portion 106, respectively, thereby producing stream data, or it divides the stream data into the video compression data and the audio compression data, so as to input the respective data into the video compression/expansion portion 104 and the audio compression/expansion portion 106.

A reference numeral 108 depicts a hard disc driver portion, and it writes on a hard disc 109 the stream data and/or various kinds of information files, which are produced within the multiplexing/dividing portion 107 through the system controller portion 101, in a predetermined format, when recording AV data, or reads out the stream data and/or the various kinds of information files, which are recorded on the hard disc 109, when reproducing the AV data. A reference numeral 111 depicts an optical disc loading portion, with which the optical disc 112, such as, the BD or DVD, etc., can be inserted/discharged freely. A reference numeral 110 depicts an optical disc driver portion, and it writes on the optical disc 112 the stream data and various kinds of information files, which are produced within the multiplexing/dividing portion 107 through the system controller portion 101, in a predetermined format, when recording AV data, or reads out the stream data and/or the various kinds of information files, which are recorded on the optical disc 112, when reproducing the AV data. Also, a reference numeral 113 depicts a semiconductor memory driver portion, 114 a semiconductor memory loading portion, and 115 a semiconductor memory, such as, a SD card or a SDHC (SD High-Capacity) card, etc., and they carry the control of reading/writing of the stream data and the various kinds of files into the semiconductor memory, in the similar manner to the control of the optical disc mentioned above.

Herein, the video compression/expansion portion 104, the audio compression/expansion portion 106, the multiplexing/dividing portion 107, the hard disc driver portion 108, the optical disc driver portion 110, or the semiconductor memory driver portion 113 may be in the structure for carrying out an operation thereof, as a circuit, in a manner of a hardware, or may be memorized as a program within the system controller portion 101, to execute the processing in a manner of software. This is because it may bear an easiness of control or a spatial advantage when designing a circuit. On the hard disc 109 or the optical disc 112, or in the semiconductor memory 115 are recorded the files, which are obtained by digitally compressing the AV data in the information volume thereof, mainly, such as, the video information and the audio information, for example, and also management data of those AV data, etc. In the present embodiment, although the explanation will be given on an example of BD or DVD, as the optical disc, however, the kind thereof should not be limited, especially, but it may be other optical disc, such as, a HD (High Definition)-DVD, etc., for example. Also, with the hard disc in the present embodiment, although it is explained in case of being built in the video camera; however, it should not be limited only to the built-in type, but it may be a detachable type. If being the detachable type, since the data recorded on the hard disc can be carry out, it is easy to move the data to other equipment.

A reference numeral 116 depicts a communicator portion, and it conducts a communication process with other equipment, such as, an information processing apparatus, etc. A reference numeral 118 depicts an external recording apparatus, and in more details, it is an information recording apparatus having a recording media, such as, a file server, a video recorder and a home server, etc., for example. Of course, this apparatus may be a video camera, and for example, also the video cameras shown in FIG. 1 can transmit or communicate with each other.

A reference numeral 119 depicts a monitor portion, and it applies a LCD (Liquid Crystal Display), etc., in many cases. On the monitor portion 119 is displayed GUI (Graphical User Interface), such as, a menu of the recording/reproducing apparatus 100, or video information inputted from the image pickup element 102 when recording, or video information reproduced from the DVD or the hard disc when reproducing. Further, in case where the face detection function is set to be effective and further when detecting a face, a frame is displayed on it, for indicating on which face is in the focus.

A reference numeral 120 depicts a video recognition portion, which determines there is a face of a person or not within a region where the video camera picks up a picture, for example, with recognition of a specific picture, a face of the person or the physical characteristics thereof, a fingerprint or an iris of the person, etc., from the object or the AV data. Further, with comparison of the above-mentioned video recognized to a video pattern, which is registered in advance, it is possible to identify a person, and therefore, it is easy to detect a figure and pick up a picture of only her/his own child, among a plural number of presences of children of the same generation, for example, in the school sports meeting.

A reference numeral 121 depicts an operation portion, and it is constructed with, for example, various kinds of buttons and/or switches, such as, a toggle switch, a rotary switch, a slide switch, etc. Also, the structure of providing a touch panel on the monitor portion 119 may be applied in common. This operation portion 121 includes therein buttons for conducting general operations on the video camera; e.g., for example, pushdown of a movie recording button starts or stops the recording of moving picture (hereinafter, "movie recording"). Also, with the video camera according to the present invention, there is included a face detection button for exchanging the face detection function between valid and invalid.

A power source portion 122, being such as a battery or an AC power source for driving an apparatus, supplies a power source for driving the recording/reproducing apparatus.

Figure 2:
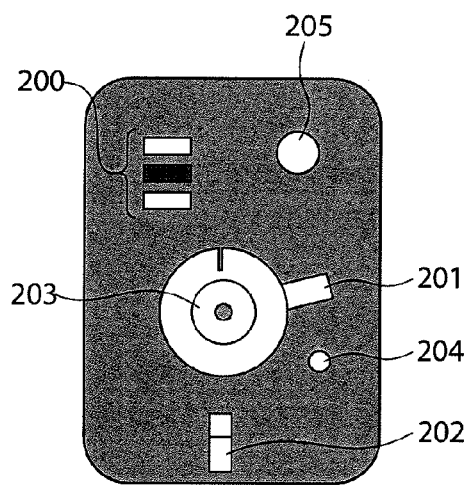
FIG. 2 is a view for showing an example of the structure of an operation portion of the video camera.

FIG. 2 shows an example of the structures of the operation portion 121, which is equipped with the video camera 100. In the example shown in FIG. 2, it is composed of a plural number of recording medium LEDs (Light Emitting Diode) 200 for indicating which recording medium is selected among a plural number of recording media, a recording medium selector switch 201 for selecting on which recording medium the recording should be made, a recording medium extract switch 202 for taking out a recording medium dischargeable from a main body of the video camera, for example, BD, etc., a movie recording button 203 for starting the movie recording onto the recording medium selected or stopping the recording, a recording condition LED 204 for indicating on whether the video camera is in the condition of recording the moving pictures or not, and a face detection button 205 for exchanging the face detection function between valid and invalid. The user can select the face detection function to be valid or invalid with using the face detection button 205. Thus, depending on a way of use and/or the object, the user can select the face detection function to be valid or invalid. For example, changing the face detection function to be invalid when she/he wishes to pick up a landscape or the like, other than a person, or otherwise changing the face detection function to be valid when she/he wishes to pick up a person; thereby it is possible to record a beautiful moving picture depending on the object. Also, if keeping the face detection function to be valid when taking a picture other than a person, the video camera operates such that it always detects a face among the pictures to be picked up. Thus, irrespective of no intension of the user, picking up a person, but because of setting the face detecting function valid, the hardware, such as, the video recognition portion 120 or the like, for example, necessary for achieving the face detection function, and the control software for that hardware, as well, starts the operations thereof, and this results into consumption of a useless electric power.

FIGS. 3A to 3D and FIGS. 4A to 4D show examples of display on the monitor portion 119, within the video camera being in the operation thereof.

FIGS. 3A to 3D show an example of display under the condition of not recording the moving picture. In this instance, on the monitor portion 119 are displayed a picture picked up by the image pickup element 102 and also the information of whether the date and/or the recording time of the moving picture and/or the face detection is/are valid or invalid, etc., which are superimposed on the video during picking up the picture as OSD (On Screen Display).

Figure 3B:
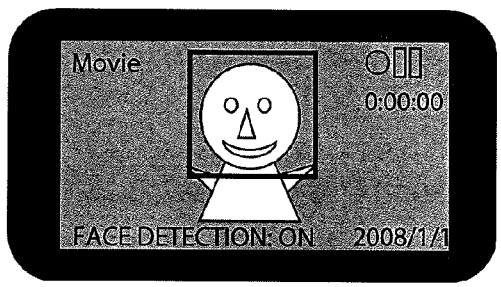

FIGS. 3A and 3B show examples of display, when the camera records no moving picture and further it picks up a person. In the example shown in FIG. 3B, since the face detection function is valid (ON), a face of the person whose picture is taken is detected, and a face detection frame is displayed, indicating that the face of that person is brought into a focus. On the other hand, in FIG. 3A, though the face of the person is picked up, but since the face detection function is invalid (OFF), no face detection frame is displayed. In this instance, it can be considered that, in FIG. 3B, an intention of the user is coincident with the operation of the video camera. Because, upon basis of the fact that the user sets the face detection function valid and further she/he aims the face of the person as the object, the video comes to operate so that it takes a picture of the face of the person, as clear as possible. On the other hand, it can be considered that the intention of the user is not coincident with the operation of the video camera in the example shown in FIG. 3A. Because, irrespective of the fact that the user sets the face detection function to be invalid, but the face of the person is the object; i.e., though the video camera has the face detection function, but that function is not utilized effectively. Of course, upon basis of the fact that the face detection function is always set to be invalid by the user, who fully knows the relationship between the operation of the camera and the consumption of electric power, it can be considered that she/he intends to lessen the consumption of electric power for the face detection control, as far as possible. However, since she/he purchased the video camera equipped with the face detection function, on purpose, it is difficult to consider that the user intentionally sets the function to be invalid, without utilizing that function effectively, and there can be expected an occurrence of situation that she/he pushes down the face detection button, erroneously, by some chance, etc. For this reason, it can be said that the power-saving control of the video camera should be executed, preferably, without raising consciousness of the user, as far as possible.

Figure 3C:
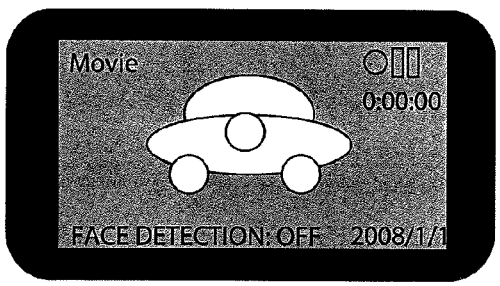
Figure 3D:
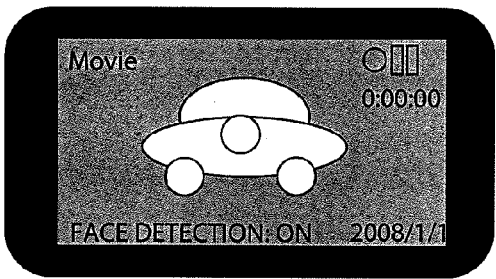

Next, FIGS. 3C and 3D are views for showing examples of display when the camera records no moving picture and further it picks up an object other than the person. In the example shown in FIG. 3C, since the face detection function is invalid and the object of photographing is not the person, no such the face detection frame is displayed as shown in FIG. 3B. In this instance, it can be considered that the intention of the user is coincident with the operation of the video camera in FIG. 3C. Because, upon basis of the fact that the user sets the face detection function invalid, and further she/he aims an object other than the person, the video camera can operate to pick up a picture with the necessary and minimum electric power, without operating the face detection function uselessly.

On the other hand, in the example shown in FIG. 3D, it can be considered that the intention of the user is not coincident with the operation of the video camera. Because, irrespective of the fact that the user sets the face detection function valid, she/he aims the object other than the person, then the video camera always tries to detect the face of the person among the video, which is picked up, with the face detection function, and this results into a useless consumption of electric power. Such a case may be occur, for example, upon the fact that the user leaves the video camera as it is, with turning the power source of the video camera "ON", due to various reasons. In this manner, though the face detection function should be turned to be invalid if trying to pick up the picture other than the person; however, from a standing point of the user, there is a high possibility that her/his consideration cannot reach to that the power consumption comes to be large due to the fact of turning the face detection valid. For this reason, it can be considered that the user may consume the useless electric power with always turning the face detection function to be valid, irrespective of the fact that the object is the person or not.

From the above, for example, in case where an object of photographing is something other than the person, and further the face detection function is set valid, i.e., in case when it can be considered that the electric power is consumed uselessly, it is superior in the usability or user-friendly, if the video camera automatically controls to lessen the electric power consumption, without troubling the user. Then, in such cases can be considered various means for lessening the consumption of electric power. In particular, under the condition that the power source of the video camera is turned "ON", but not recording the moving picture, since not giving a big influence upon operation by the user, it is easy to apply the means for lessening the consumption of electric power.

Figure 4A:
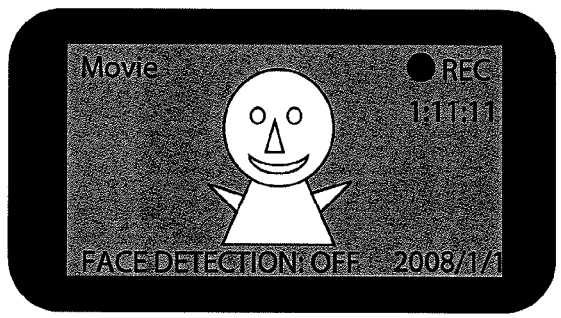
FIGS. 4A to 4D for showing an example of displays on the monitor portion of the video camera, in particular, during when recording a moving picture.
Figure 4B:
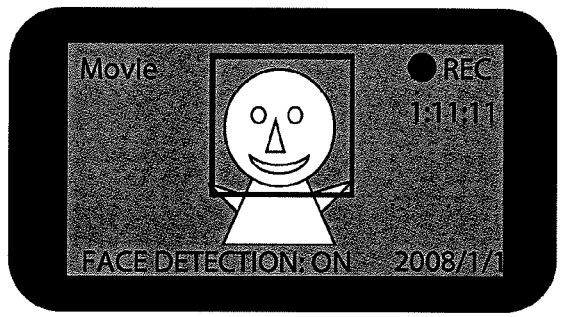
Figure 4C:
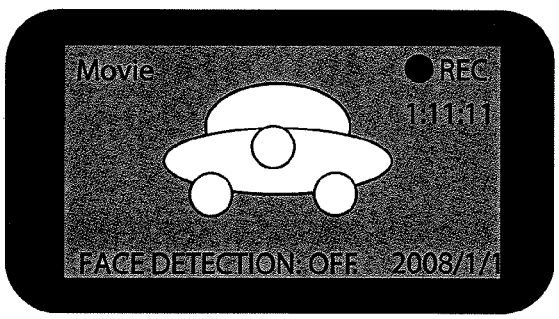
Figure 4D:
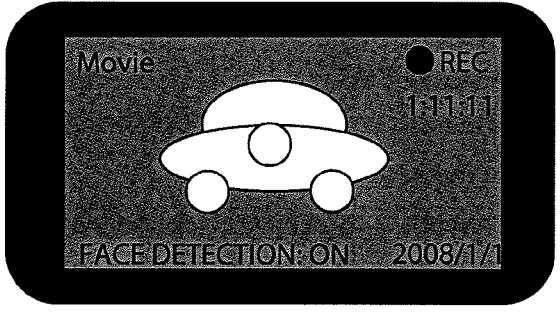

FIGS. 4A to 4D show examples of display on the monitor portion 119, in particular, when recording the moving picture. FIG. 4A corresponds to FIG. 3A, FIG. 4B corresponds to FIG. 3B, FIG. 4C corresponds to FIG. 3C, and FIG. 4D corresponds to FIG. 3D, respectively, and the OSD display at the right-upper on the screen indicates that the camera is recording the moving picture. Regarding that the face detection frame is displayed when detecting the face under the condition that the face detection function is valid, it is same to when the camera is in the operation of the movie recording and when it is not. Also, in FIG. 4A and/or FIG. 4D, the camera consumes the electric power uselessly, similar to in FIG. 3A and FIG. 3D, then there should be provided any means for lessening the electric power consumption; however, it can be said that such means is difficult to be applied comparing to when the camera is in the movie recording operation. Because, during the time when recording the moving picture, comparing to when not recording the moving picture, the operation is made by an intention of the user, i.e., the movie recording button 203 is pushed down. For this reason, it can be considered that the camera is in the condition of consuming the electric power, uselessly, not because of the intention of the user, but by some reasons on the contrary to the intention of the user. As an example of this, as is shown in FIG. 4D, there can be considered the situation where the person frames out (i.e., comes out from the frame) on the way, although aiming the face of the person as the object when starting the movie recording, under the condition of aiming the object other than the person irrespective of the fact that the face detection function is valid.

From the above, in order to lessen the electric power, which is consumed, uselessly, while utilizing the distinctive characteristics of the video camera mounting the face detection function, effectively, it is preferable to execute the control, with combining the information, i.e., not only the face detection is valid or invalid and detection is made on the face or not, but also the information of being in the movie recording operation or not.

Figure 5:
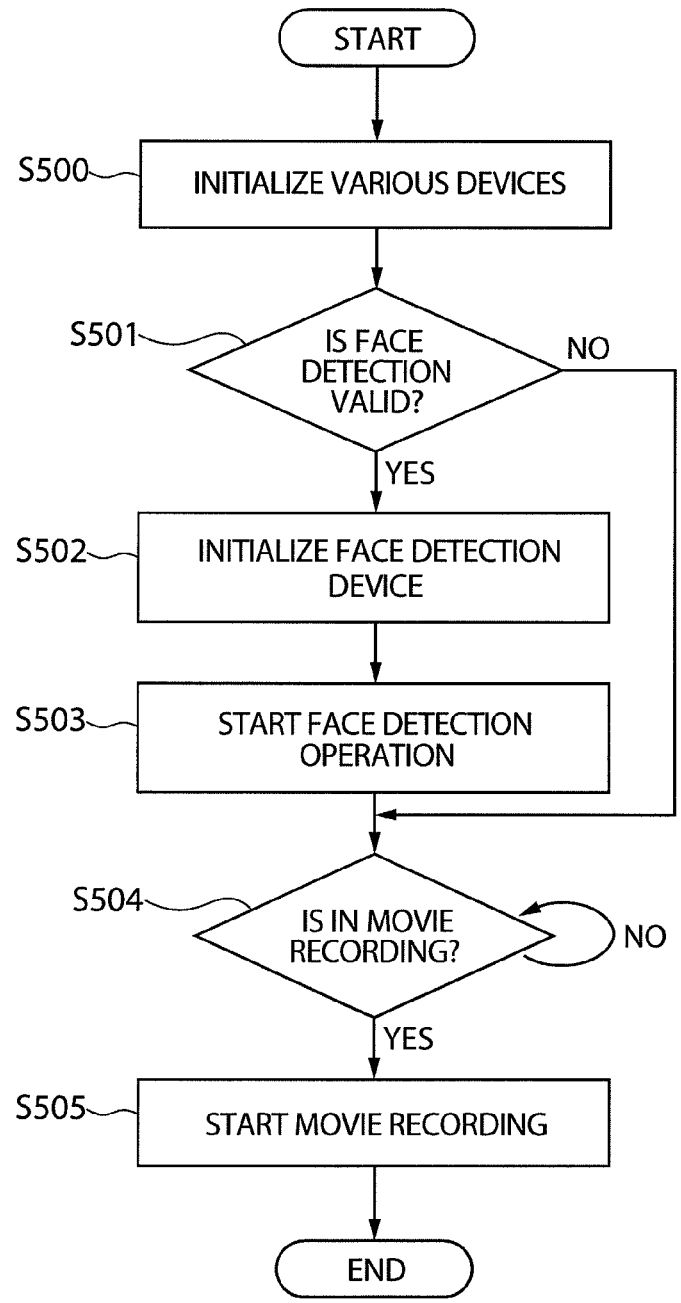
FIG. 5 is a view for showing an example of a processing flow, from a turning-on of an electric power to beginning of recording a moving picture, within a common video camera.

FIG. 5 shows a sequence from turning "ON" of the power source up to start of the movie recording, within a general video camera.

First of all, in a step S500, initializing processes fare conducted for various kinds of devices, which are equipped with the video camera. In a step S501, determination is made on whether the face detection function is valid or invalid. In the determination in the step S501, for example, while memorizing setup information, on whether the face detection function is valid or invalid, into a RAM (Random Access Memory) equipped with the system controller portion 101, in advance, it is enough to read out that setup information. This is because it results into time-shortening of the process and an improvement of controllability. As a result of determination in the step S501, when the face detection function is set to be valid, then the process advances into a step S502 where initialization is conducted on the device (s), which is/are necessary for operating the face detection function. Herein, the device to be initialized is, for example, the video recognition portion 120 shown in FIG. 1, etc. Further herein, for the purpose of simplification of explanation, the step S500 is separated from the step S502; however there is no problem if conducting the initializing process for the face detection device in the step S500. This is because; it results into time-shortening of the process and an improvement of controllability. Next, the face detection operation is started in a step S503, thereby executing the process for detecting the face of the person among the video which is picked up. This process is not finished by only one time, i.e., since the video picked up is inputted continuously, without interruption, during the time when the face detection function is set to be valid, then the process is continued, for detecting the face of the person among it. Next, in a step S504, determination is made on whether the camera is in the movie recording operation or not. Information on staring the movie recording or not may be memorized in the RAM, etc. Further, the information on staring the movie recording or not may be renewed, for example, when the movie recording operation is started or stopped through operation of the movie recording button 203 shown in FIG. 2 by the user. And, the step S504 is also executed when the face detection is determined to be invalid in the step S501. When determining not being in the movie recording operation in the step S504, the process does not advance into a step S505 until when the movie recording button is pushed down. During this time, when the face detection function is valid, detection continues on the face of the person among the video, which is photographed. Examples of the display on the monitor portion 119 of the video camera at this time are shown in FIGS. 3B and 3D. On the other hand, examples of the display, when the movie recording button is not pushed down and the face detection function is invalid, are shown in FIG. 3A and FIG. 3C. If the movie recording button is pushed down, then the process advances into the step S505, so as to start the movie recording process. Examples of the display on the monitor portion 119 of the video camera, when starting the movie recording, are as shown in FIGS. 4A to 4D. As was shown in the above, in the sequence after turning the power source ON up to the starting of the movie recording within the general video camera, it is impossible to execute such the control that it lessens the consumption of useless electric power, while utilizing the distinctive characteristics of the face detection function, effectively.

Then, in FIG. 6 is shown an example of a sequence after turning the power source ON up to the starting of the movie recording, adding a control for lessening the useless consumption of electric power while utilizing the distinctive characteristics of the face detection function, within the video camera according to the present invention. The sequence of processes shown in FIG. 6 is obtained by adding the processes from a step S600 to a step S603 to the sequence shown in FIG. 5. For this reason, the detailed explanation of contents of each of the steps, which are already explained in FIG. 5, will be omitted, herein.

After completing the initialization of the device(s) necessary for operating the face detection function in the step S502, but before actually operating the face detection function in the step S503, a face detection flag is turned "ON" in a step S600. The face detection flag mentioned above may be bit information, defining "0" to be "FF" and "1" to be "ON", etc., for example, and it may be memorized in the RAM, which is equipped with the system controller portion 101, etc. However, though not showing in the figure, but it is assumed that the face detection flag mentioned above is set to "OFF", once, when initializing. For this reason, in case where the face detection is invalid in the step S501, there is no necessity of changing the setup of the flag, especially. Of course, there is no problem if the flag is turned "ON" in advance, and in such case, it is enough to change the setup of the flag into "OFF" when the face detection function is invalid, while not changing the setup of the flag into when the face detection function is valid. When completing the setup of the face detection flag in the step S600, then the process advances to the step S503 and the step S504. In the step S504, determination is made on whether the camera is in the movie recording operation or not, and when it is in the movie recording operation, the step advances to the step S505, but without conducting the power-saving control, especially, and thereby starting the process for movie recording. On the other hand, when determining that it is not in the movie recording operation, then the process advances to a step S601. In this step S601, confirmation is made on the condition of the face detection flag. The face detection flag to be confirmed herein is the flag information, which is set in the step S600. Thus, the face detection flag is read out from the RAM equipped with the system controller portion 101, etc., for example, and if the flag is "ON", then it is determined that the face detection function is set to be invalid. Herein, when determining that the face detection flag is "ON", i.e., when the face detection function is set to be valid, then the process advances to a step S602.

In the step S602, it is determined on whether detection is made or not, upon the face among the video, which is picked up by the video camera. The step S602 is a step, which should be executed when the face detection function is set to be valid. However, even if the face detection function is valid, it is not always true that detection is made on the face of the person. For example, as is shown in FIG. 3D, there may be a case where photographing is made on the object other than the person. In this instance, the process advances to a step S603. On the other hand, if the object is the person, for example, as is shown in FIG. 3B, the face detection frame is displayed on the vase of the person. In this instance, it is determined that the camera is in the face detection operation in the step S602, and again, it is determined the camera is in the movie recording operation or not, in the step S504. In the step S603, the power-saving control is executed for lessening the consumption of electric power. As was shown hereinbefore, the step S603 is executed in case when the camera is not in the movie recording operation, and the face detection function is set to be valid, and further it does not detect the face of the person. Thus, since the camera picks up a picture other than the face of the person, irrespective of the fact that the face detection function is set to be valid by the user, the both conflict with each other. In this instance, although many users are unconscious thereof, but because the video camera actually tries to detect the face of the person in the operation thereof, the electric power is consumed, uselessly, where the user does not intend to do so. Also, since the camera in not in the movie recording operation, it is the situation where it is easy to execute the control for lessening the consumption of electric power, too. This is because, since the original or inherent purpose of the video camera is to record the moving picture, it is not preferable to conduct simplification of the function, which is provided for the purpose of power-saving during the movie recording operation; however, inconvenience felt by the user is less if conducting the simplification of the function when it is not in the movie recording operation. Then, according to the present invention, the control for lessening the consumption of electric power is executed, as is shown in FIG. 7, for example.

FIG. 7 shows an example of a detailed control flow of the power-saving control, which is shown in the step S605 in FIG. 6.

Figure 8A:
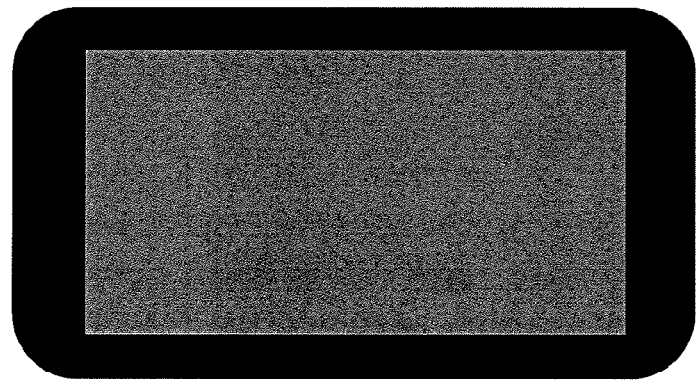
FIGS. 8A to 8C are views for showing differences in the brightness for each luminance on the monitor portion of the video camera.
Figure 8B:
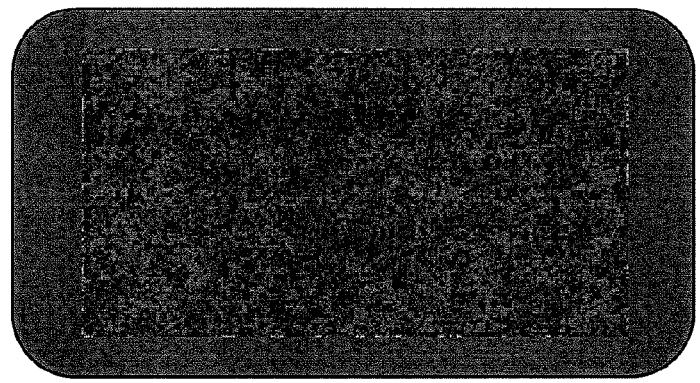
Figure 8C:

Herein, as the distinctive feature of the LED, the higher of the luminance or brightness, the larger of the consumption of electric power, and the lower the luminance the smaller the consumption of electric power. Then, in FIG. 7, the consumption of electric power is lessened by reducing the luminance or brightness of the LCD. Also, as a presumption, the video camera according to the present invention has a function for enabling to change the brightness of the LCD, freely. With the brightness of the LCD, changing that depending on preference of the user and/or the circumstances of surroundings when using the video camera brings about user-friendly usability, and also the change can be made from a menu screen, or can be controlled to be changed, automatically, depending on the condition, according to the present invention. Further, it is preferable that the brightness of the LCD can be set at several levels. In FIGS. 8A to 8C are shown examples when changing the luminance level of the LCD. FIG. 8A shows the condition where the brightness is at the highest (at level 2), FIG. 8B the condition where the brightness falls down to a half (½) comparing to that shown in FIG. 8A (at level 1), and FIG. 8C the condition where the LCD is put out (at level 0). According to the present embodiment, explanation will be given upon a presumption that the brightness of the LCD can be changed, in a manner of three-steps.

Firstly, when starting the power-saving control, in a step S700 is obtained the information, i.e., at which level the brightness of the LED is set at present. This setup value of the brightness of LCD is the information, which the video camera memorizes when it changes the brightness of LCD, and it is memorized in the RAM, which is equipped with the system controller portion 101, etc., for example. Next, in a step S701, upon executing the power-saving control is obtained the information, i.e., to which level the brightness of LCD should be lowered down. This information of reducing the brightness of LCD is information, which the user can set up from the menu screen, etc., depending on the preference, and it is memorized in the RAM, which is equipped with the system controller portion 101, etc., for example. It is preferable to make a setup so that the brightness of LCD goes down to the level 1 when the user wishes to reduce the electric power to be consumed, but also wishes to maintain the usability, and to the level 0 when she/he wishes to reduce the electric power to be consumed, largely, although it brings about a bad usability. In the present embodiment, explanation will be made upon an assumption that the setup value of the brightness of LCD is the level 2, and that the information of reducing the brightness of LCD is the level 1. In a step S702, comparison is made between the above-mentioned setup value of the brightness of LCD and the above-mentioned information of reducing the brightness of LCD, and if both are coincident with, then the process is ended while determining that there no room of reducing the electric power consumption any more, but if the both are in conflict with, the process advances to a step S703 while determining that there is a room of reducing the electric power consumption. In the step S703, the setup value of the brightness of LCD is changed into the value, which is designated by the information of reducing the brightness of LCD. Herein, because the setup value of the brightness of LCD is the level 2 and the information of reducing the brightness of LCD is the level 1, the setup value of the brightness of LCD is changed from the level 2 down to the level 1. Thus, the consumption of electric power is reduced by reducing the brightness of LCD down to a half (½) thereof. Thereafter, the process advances into a step S704, where the setup value of the brightness of LCD memorized in the RAM, which is equipped with the system controller portion 101, etc., is renewed from the level 2 to the level 1, and thereby ending the process. However, as is apparent from FIG. 6, the present process has a possibility of being repeated, but if once equalizing the setup value of the brightness of LCD and the information of reducing the brightness of LCD in the step S703, then in the next time, the setup value of the brightness of LCD and the information of reducing the brightness of LCD are determined to be equal to each other in the step S702, but the process does not advance to the step S703; therefore, the reduction of the brightness will not occur many times.

As was mentioned above, by lowering the level of the brightness of LCD in accordance with the processing flow shown in FIG. 7, it is possible to lessen the electric power to be consumed in lightening the LCD among the electric power consumption of the video camera. In case where the electric power consumption should be lessened further, than this example, it is enough to determine the information of reducing the brightness of LCD, which is obtained in the step S701, at the level 0. With determining thereof in this manner, it is possible to lower the brightness of LCD from the level 2 down to the level 0, by two (2) steps; i.e., the electric power consumption can be reduced further, comparing to that when lowering it down to the level 1. In this instance, to which level it should be lowered down, the information of reducing the brightness of LCD may be determined depending on the preference of the user her/himself.

Figure 9A:
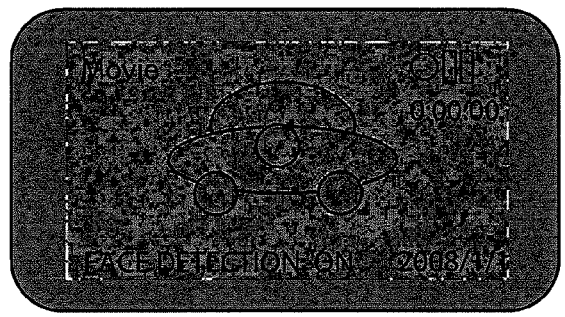
FIGS. 9A to 9D are views for showing an example of display on the monitor portion during when executing a power-saving control.

FIGS. 9A to 9D show therein examples of display on the LCD, which are obtained when applying the present invention therein. FIG. 9A shows the condition where the electric power consumption is reduced by lowering the brightness of LCD down to the level 1, because the camera is not in movie recording operation, the face detection function is valid, and further the camera is not in the operation of detecting the face of the person. However, though not shown in the figure, when automatically conducting the control for reducing the electric power to be consumed, it increases the usability further superior, if displaying an OSD indicative thereof, e.g., an message or icon indicting "during power-saving" or the like, for example. Further, when the brightness is reduced down to the level 1, displaying the OSD on the LCD enables visual recognition of the power-saving; however when it is the level 0, the OSD cannot be recognized since the LCD is OFF. For this reason, though this is also not shown in the figure, it is possible to display that the camera is in the power-saving operation, by lightening or blinking LED, etc., with providing it on the operation portion shown in FIG. 2 and an outer frame portion of the LCD, which is shown in FIG. 3, etc. Further, as was mentioned above, since for the user it is difficult to recognize the OSD display, visually, on the LCD under the power-saving condition, it is preferable to conduct a notice to the user before the camera transits into the power-saving condition. For example, when the condition of transition into the power-saving condition is satisfied, it is enough to execute the power-saving control, such as, reducing the brightness of LCD, after noticing to the user by displaying a message "transit into power-saving condition", etc., on the LCD, before transiting into the power-saving condition. Also, displaying a message on the LCD, such as, "comeback from power-saving condition", etc., when turning back from the power-saving condition, it is possible to make the usability superior. Also, in this instance, if displaying the message on the LCD after turning back the brightness of LCD, by taking the brightness of LCD into the consideration thereof, for the user it is easy to recognize it easily. Of course, the method for noticing to the user should not be limited to this, and for example, by making guidance through a voice, etc., the similar effect can be obtained.

Figure 9B:
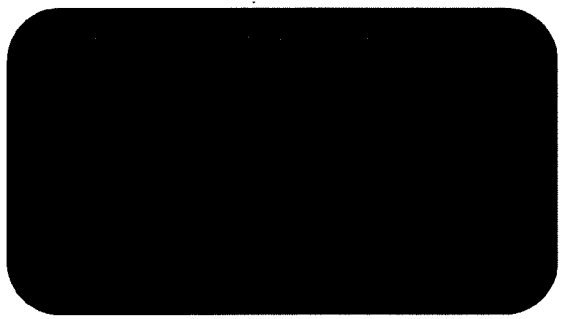
Figure 9C:
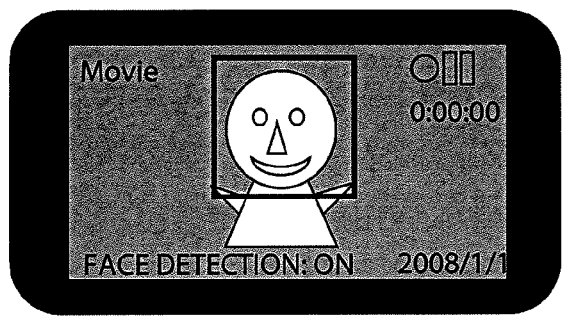
Figure 9D:
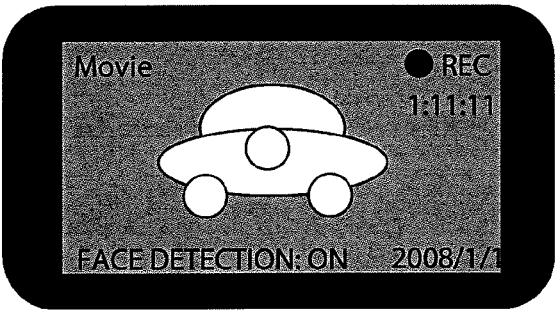

FIG. 9B shows the condition where the brightness of LCD is lowered down to the level 0, for the purpose of reducing the electric power consumption further than that of FIG. 9A. Since the LCD is in the condition of being put out, of course not the video under the photographing, but also no OSD or the like is displayed. For this reason, an effect is large for reducing the electric power consumption, comparing to that shown in FIG. 9A, but this makes the usability worse. FIG. 9C shows the condition where the brightness of LCD is kept at the level 2 as it is, without conducting the power-saving control, because the intention of the user and the operation of the video camera are coincident with, judging from the fact that the camera is not in the movie recording operation, that the face detection function is valid, and further that the camera is in the operation of detecting the face of the person. FIG. 9D shows the condition where the brightness of LCD is kept at the level 2 as it is, without conducting the power-saving control, because the usability is worsen if lowering down the brightness of LCD in accordance with the power-saving control, judging from the fact that the face detection function is valid and that the camera is not in the operation of detecting the face of the person, but the camera is in the movie recording operation.

With the means mentioned above, it is possible to reduce the useless consumption of electric power. However, the controlling flows shown in FIGS. 6 to 9 are only examples of the means for achieving the power-saving control, but not should be limited to those, and various modifications thereof are conceivable therefrom.

For example, as a method for reducing the electric power to be consumed by reducing the brightness of LCD, as was mentioned above, can be considered one of referring to information of a residual electric charge within the battery of the video camera. Thus, when the camera is not in the movie recording operation, the face detection function is valid, and further the camera is not in the operation of detecting the face of the person, not simply changing the value of the information of reducing the brightness of LCD, but by referring to the residual charge in the battery of the video camera, wherein the brightness of LCD may be changed to the level 1 when the residual charge in the battery is larger than a threshold value while the brightness of LCD may be changed to the level 0 when it is smaller than the threshold value. Further, the brightness level of LCD may be lowered down, every time when the time, during which the camera is not in the movie recording operation, the face detection function is valid, and further the camera in not in the face detection operation, elapses a certain constant time period, i.e., the level may be lowered from the level 2 down to the level 1, from the level 1 down to the level 0, gradually, depending on the elapsing time. However, when turning back from the power-saving condition, the camera resets a timer for watching the time elapse. This reset process is necessary for executing the power-saving control again, correctly, depending on the time elapse, after turning back from the power-saving control, once. If no such reset is made on the timer, then the time, during which the camera is not in the movie recording operation, the face detection function is valid, and further the camera in not in the face detection operation, is added, continuously, and the camera transits into the power-saving condition, immediately, when satisfying the condition that the camera is not in the movie recording operation, that the face detection function is valid, and further that the camera in not in the face detection operation, without waiting the certain constant time-period.

Also, it is possible to achieve reduction of the electric power consumption by a means other than reduction of the brightness of LCD. For example, by turning a control driver portion and a loading portion for each medium into a disable condition or a sleeping condition, the reduction of the electric power consumption can be obtained. With this means, under the power-saving condition, since the recording cannot be stared after initiating hardware for the media control mentioned above, in particular when the user tries to start the movie recording; there is a drawback of taking time until starting the movie recording. For this reason, it is preferable to leave a selection to the user, i.e., which one the user prefers between the usability and the reduction of electric power consumption.

Figure 10:
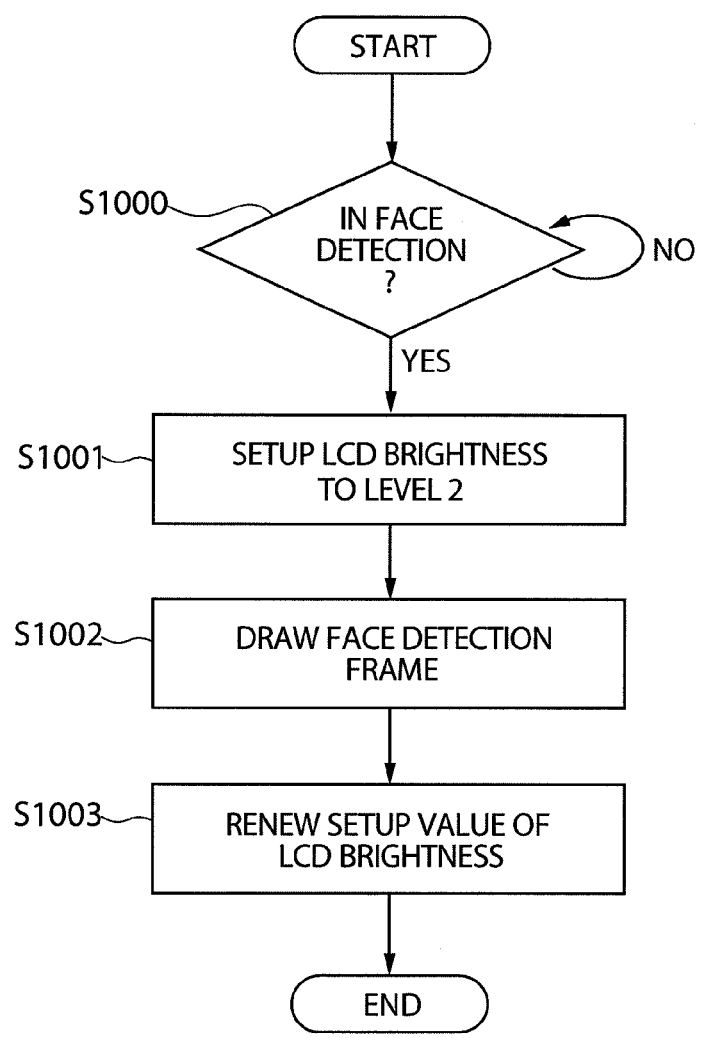
FIG. 10 is a view for showing an example of a processing flow, in particular, when returning from a power-saving condition.

Heretofore, mentioning is made on the method for reducing the electric power consumption, but hereinafter, explanation will be given about the operation of the video camera when turning back from the power-saving condition. As an example thereof, explanation will be made on a comeback process from the condition of reducing the electric power consumption by lowering the brightness of LCD down to the level 1, when the camera is not in the movie recording operation, the face detection function is valid, and further the camera in not in the face detection operation, by referring to FIG. 10. In this FIG. 10 is shown an example when coming back from the power-saving condition, by taking detection of the face of the person as a chance. Firstly, in a step S1000, a check is made on whether the camera is in the face detection operation or not. If not in the face detection operation, not executing the comeback process from the power-saving condition, but the step S1000 is repeated, again. Herein, if detecting a face of the person in the step S1000, then the process advances into a step S1001 for coming back from the power-saving condition. In the step S1001, the brightness of LCD, which was lowered down to the level 0 or the level 1 through the power-saving control, is set to the level 2. With this, it can be said that the power-saving condition is ended, and then, the brightness of LCD comes to be high. Next, in a step S1002, the face detection frame is drawn surrounding the face of the person, which is detected in the step S1000. However, it does not matter even if the steps S1001 and S1002 are exchanged in an order of processing thereof. Further, in a step S1003, the setup value of the brightness of LCD, which is memorized in the RAM, etc., is renewed. In the present embodiment, the setup value of the brightness of LCD is renewed to the brightness level 2, which is set up in the step S1001, and the process is ended. An example of display on the LCD, at the time point when the processes mentioned above are ended, is as shown in FIG. 9C, wherein the brightness of LCD becomes high, and also the face detection frame is displayed surrounding the detected face of the person. This is the condition where the intention of the user and the operation of the video camera are coincident with, because the face detection function is valid and the camera is detecting the face of the person.

Also, as is shown in FIG. 10, not only coming back from the power-saving condition when detecting the face, but it is also possible that the camera comes back from the power-saving condition when the movie recording button is pushed down, for example. In this instance, it is enough to control the camera, such that, while determining if the movie recording button is pushed down or not, in the similar manner of the step S1000 shown in FIG. 10, for example, the camera comes back from the power-saving condition when the movie recording button is pushed down, thereby increasing the LCD brightness level, as well as, starting the movie recording. Of course, as the condition for coming back from the power-saving condition may be provided only either one of the followings; when the face is detected and when the movie recording button is pushed down, or both of them. Or, there is shown the case where the brightness of LCD is reset from the level 0 or the level 1 up to the level 2, immediately, when coming back from the power-saving condition in the step S1001; however not limiting to this, the brightness level may be increased by only one (1). In this case, while obtaining the setup value of the brightness of LCD, it is enough to change the level, i.e., to the level 1 if it is the level 0, or to the level 2 if it is the level 1. Furthermore, while memorizing to which level the brightness of LCD is set up when starting the power-saving control, it is also enough to make such a control that the memorized information mentioned above is read out, when coming back from the power-saving condition, so as to reset to the LCD brightness level that is read out. Still, for obtaining a further simple structure thereof, it is enough to provide a switch for exclusive use for coming back from the power-saving condition, i.e., coming back from the power-saving condition, immediately, when that switch is pushed down.

Further, in case of applying a means other than that for reducing the brightness of LCD, as a means for the power-saving control, for example, in case of brining the certain hardware into the sleeping condition thereof, executing the control of brining the hardware mentioned above, being in the sleeping condition thereof, means the comeback process from the power-saving condition.

Further, with many video cameras, it is possible to record, not only the moving picture, but also the still picture. In the present embodiment, the explanation was given only on the example of the case when conducting the movie recording (i.e., recording the moving picture), but in the similar manner, it is also applicable into the case when recording the still picture. In that instance, it is further preferable in the usability, for example, if determining on whether it is in a movie recording mode or a still picture recording mode, to change the method of control, and thereby executing the optimal power-saving control depending on the mode. For example, it is considerable that the comeback from the power-saving condition is made by chance when the movie recording button is pushed down, in the movie recording mode, but in the still picture recording mode, the control may be made by chance when, not the movie recording button, but a shutter button is pushed down fully or by half. Of course, with provision of a button for exclusive use of coming back from the power-saving control, it may also possible to let the camera come back, immediately, to the condition before executing the power-saving condition, upon pushdown of a comeback button from that power-saving condition, in both the movie recording mode and the still picture recording mode.

As was mentioned above, with the video camera according to the present invention, since it is possible to make a control to suppress the electric power consumption, when determining that it does not matter if suppressing the electric power consumption, from the information if the camera is recording the moving picture or not, the information if the face detection function is valid or invalid, and the information if the camera is detecting the face or not, and therefore being superior in the usability thereof. In more details, the explanation was given on the preferred embodiment in relation with the technology for achieving the power saving of the video camera mounting the face detection function thereon, by conducting the control such that the electric power consumption is lessened, since it is not in such situation that the user starts photographing, soon, and it is also high in a possibility of erroneous operation, such as, the video camera is left as it is, with turning the power source ON, etc., under the condition that the camera not being in the movie recording operation, that the face detection function is valid but the camera is not detecting the face.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An information recording apparatus for recording video information obtained from a sensor, comprising:
a face detecting unit, which is configured to detect a face of a person among the video information obtained from said sensor;
a face detection switching unit, which is configured to switch a setup of valid/invalid of a face detecting function by said face detecting unit;
a power-saving controller unit, which is configured to execute a power-saving control;
a recording unit, which is configured to record the video information inputted from said sensor onto a recording medium;
a controller unit, wherein
said controller unit executes a control for reducing an electric power consumption of the information recording apparatus, by said power-saving controller unit, when:
no face of the person is detected by said face detecting unit, irrespective of whether the face detecting function of said face detecting unit is set to be valid by means of said face detection switching unit, and when the face of the person is not detected by the face detecting unit;
a power-saving level setup unit, which is configured to set up a power-saving level, which is determined from a volume of electric power consumption to be reduced by said power-saving controller unit, wherein
said power-saving controller unit executes the power-saving control upon basis of the video information, which is set up by said power-saving level setup unit.

2. The information recording apparatus, as described in the claim 1, wherein
the electric power consumption to be reduced by said power-saving controller unit is an electric power to be supplied to each of units, which does not causing trouble in a usability for a user or an operation of the information recording apparatus if lessening the electric power to be supplied thereto.

3. The information recording apparatus, as described in the claim 2, further comprising:
a display unit, which is configured to display information, including the video information inputted from said sensor and an OSD (On Screen Display), wherein
the electric power consumption reduced by said power-saving controller unit is an electric power to be supplied to said display unit.

4. The information recording apparatus, as described in the claim 1, further comprising:
a power-saving control setup unit, with which a user sets up a power-saving control, wherein the followings are determined upon basis of information set up by the user, by means of said power-saving control setup unit:
if the power-saving control should be executed by said power-saving controller unit or not;
the electric power to be supplied to which unit should be reduced, by said power-saving controller unit; and
to which level a power-saving level should be set up by said power-saving level setup unit.

5. The information recording apparatus, as described in the claim 1, further comprising:
a power-saving level memory unit, which is configured to memorize the power-saving level set up into said power saving level memory unit;
a power-saving level setup information obtaining unit, which is configured to obtain setup information of the power-saving level, which is memorized in said power saving level memory unit; and
a present power-saving level obtaining unit, which is configured to obtain a present power-saving level, wherein
comparison is made between the power-saving level setup information, which is obtained by said power-saving level setup information obtaining unit and memorized in said power saving level memory unit, and the present power-saving level, which is obtained by said present power-saving level obtaining unit, and
when both are conflict with, the present power-saving level is so controlled that it comes to be equal to the power-saving level setup information.

6. The information recording apparatus, as described in the claim 5, wherein
the present power-saving level information, which is memorized in said power saving level memory unit, is renewed, when the present power-saving level is changed.

7. The information recording apparatus, as described in the claim 1, further comprising:
a power comeback unit, which is configured to return to a condition before starting the power-saving control from a power-saving condition, wherein
comeback is made from the power-saving condition by said power comeback unit, when said face detecting unit detects the face of the person, under the power-saving condition.

8. The information recording apparatus, as described in the claim 1, wherein
comeback is made from a power-saving condition by said power comeback unit, when said face detecting unit detects the face of the person which starts a recording, under the power-saving condition.

9. The information recording apparatus, as described in the claim 1, further comprising:
a battery residual charge observation unit, which is configured to observe battery residual charge; and
a battery residual charge threshold value setup unit, which is configured to set up a threshold value for the battery residual charge, wherein
said controller unit compares the battery residual charge, which is observed by said battery residual charge observation unit, and the threshold value, which is set up by said battery residual charge threshold value setup unit, and determines an operation of said power-saving controller unit, depending upon a result of the battery residual charge comparison.

10. The information recording apparatus, as described in the claim 1, further comprising:
a time elapse management unit, which is configured to manage elapse of time; and
an elapsing time threshold setup unit, which is configured to change the power-saving operation depending on elapsing of time, wherein
said controller unit executes the power-saving control by said power-saving controller unit, when detecting the following condition:
that the control of the face detecting unit has received valid information from a face detection setup information obtaining unit;
that the face of the person is not detected from a face detection observation unit; and
that a recording observation unit does not record the video information.

11. The information recording apparatus, as described in the claim 3, wherein
information, indicative of being in a power-saving operation to the user, is displayed on the display unit, during when being transited into a power-saving condition by said power-saving controller unit.

12. A power-saving method, for an information recording apparatus for recording video information obtained from a sensor, comprising the following steps:
a face detecting step, which is configured to detect a face of a person among the video information obtained from said sensor;
a face detection switching step, which is configured to switch a setup of valid/invalid of a face detecting function;
a recording step, which is configured to record the video information inputted from said sensor onto a recording medium;
a recording observing step, which is configured to observe on whether recording of the video information is conducted or not in said recording step; and
a step, which is configure to execute a control for reducing an electric power consumption of the information recording apparatus, when determining that:
no face of the person is detected by said face detecting step, irrespective of whether the face detecting function of said face detecting step is set to be valid by means of said face detection switching step, and when no recording of the video information is made by said recording step;
a step of level setup power-saving, which is configured to set up a power-saving level, which is determined from a volume of electric power consumption to be reduced by said power-saving controller unit, wherein
a power-saving controller unit execute a power-saving control upon basis of the video information, which is set up by said power-saving level setup step.

* * * * *